United States Patent
Heldberg et al.

(10) Patent No.: US 7,963,455 B2
(45) Date of Patent: Jun. 21, 2011

(54) THERMOSTAT VALVE

(75) Inventors: Carsten Heldberg, Kirchlinteln (DE); Thomas Bäther, Walsrode (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 416 days.

(21) Appl. No.: 12/302,070

(22) PCT Filed: Aug. 10, 2007

(86) PCT No.: PCT/IB2007/002229
§ 371 (c)(1),
(2), (4) Date: Nov. 24, 2008

(87) PCT Pub. No.: WO2008/020282
PCT Pub. Date: Feb. 21, 2008

(65) Prior Publication Data
US 2009/0114169 A1    May 7, 2009

(30) Foreign Application Priority Data

Aug. 16, 2006 (DE) .......................... 10 2006 038 213

(51) Int. Cl.
*G05D 23/12* (2006.01)
*G05D 23/02* (2006.01)
*F01P 7/14* (2006.01)

(52) U.S. Cl. ................ 236/93 R; 236/93 A; 236/101 C; 123/41.08

(58) Field of Classification Search ................ 236/93 A, 236/93 R, 99 J, 101 C, 101 R, 34, 34.5; 123/41.08, 123/41.09, 41.1; 137/468
See application file for complete search history.

(56) References Cited

U.S. PATENT DOCUMENTS
4,627,567 A    12/1986    Thorn

FOREIGN PATENT DOCUMENTS
DE            1159231 B    12/1963
(Continued)

OTHER PUBLICATIONS
ISR for PCT/IB2007/002229 dated Feb. 14, 2008.

*Primary Examiner* — Chen-Wen Jiang
(74) *Attorney, Agent, or Firm* — Lowe Hauptman Ham & Berner LLP

(57) ABSTRACT

A thermostatted valve used in an internal combustion engine and comprising a housing fitted with at least three ports, namely an engine port to communicate with the engine cooling system, a radiator port to communicate with the radiator, and a bypass port to communicate with a bypass, further comprising a hollow, spherical valve element supported pivotably about a pivot axis within the housing between two end positions, said valve element being fitted with at least two apertures of which one permanently communicates with the engine port and the other is situated in a plane substantially perpendicular to said pivot axis, further comprising a temperature sensor controlled valve element drive, characterized in that the axes of all ports are configured in planes that are approximately perpendicular to the pivot axis of the valve element, in that the valve element is approximately a spherical segment or a laminar sphere of which the open side communicates permanently with the engine port, further that the valve element is fitted with at least one feedthrough which in one of the end positions of said valve element is disconnected from the radiator port while in the other end position it faces this radiator port, in that an approximately spherical sealing system is configured in the zone of the radiator port and in that said drive acts on the valve element) excentrically relative to the pivot axis.

18 Claims, 5 Drawing Sheets

FOREIGN PATENT DOCUMENTS

Figure 1:
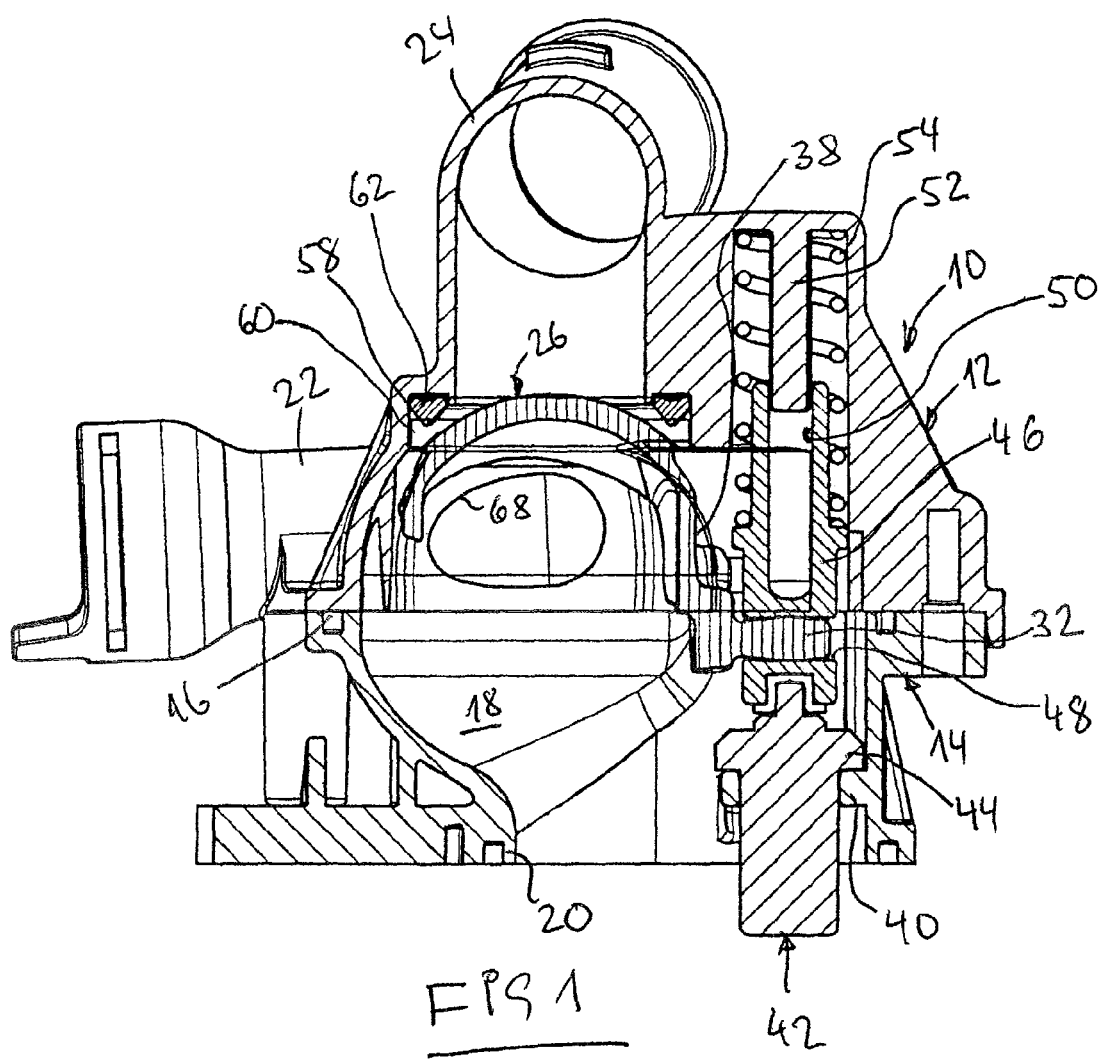

| | | |
|---|---|---|
| DE | 2943091 A1 | 5/1981 |
| DE | 10127711 A1 | 1/2003 |
| EP | 1108867 A2 | 6/2001 |
| FR | 2129397 A5 | 10/1972 |
| GB | 2008241 A | 5/1979 |
| GB | 2167836 A | 6/1986 |

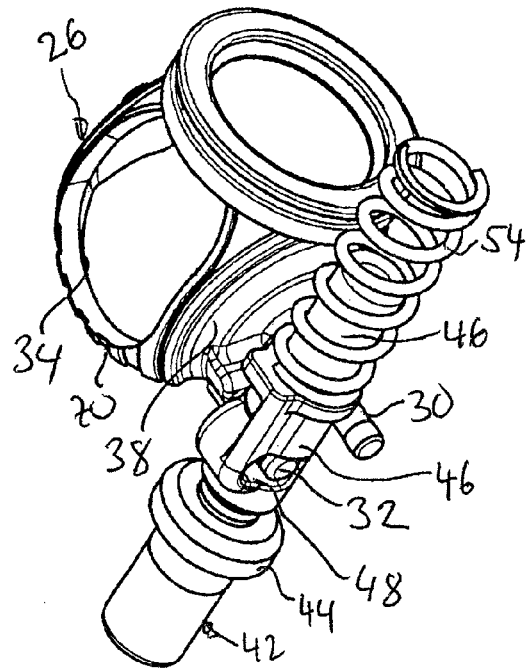
Fig 4
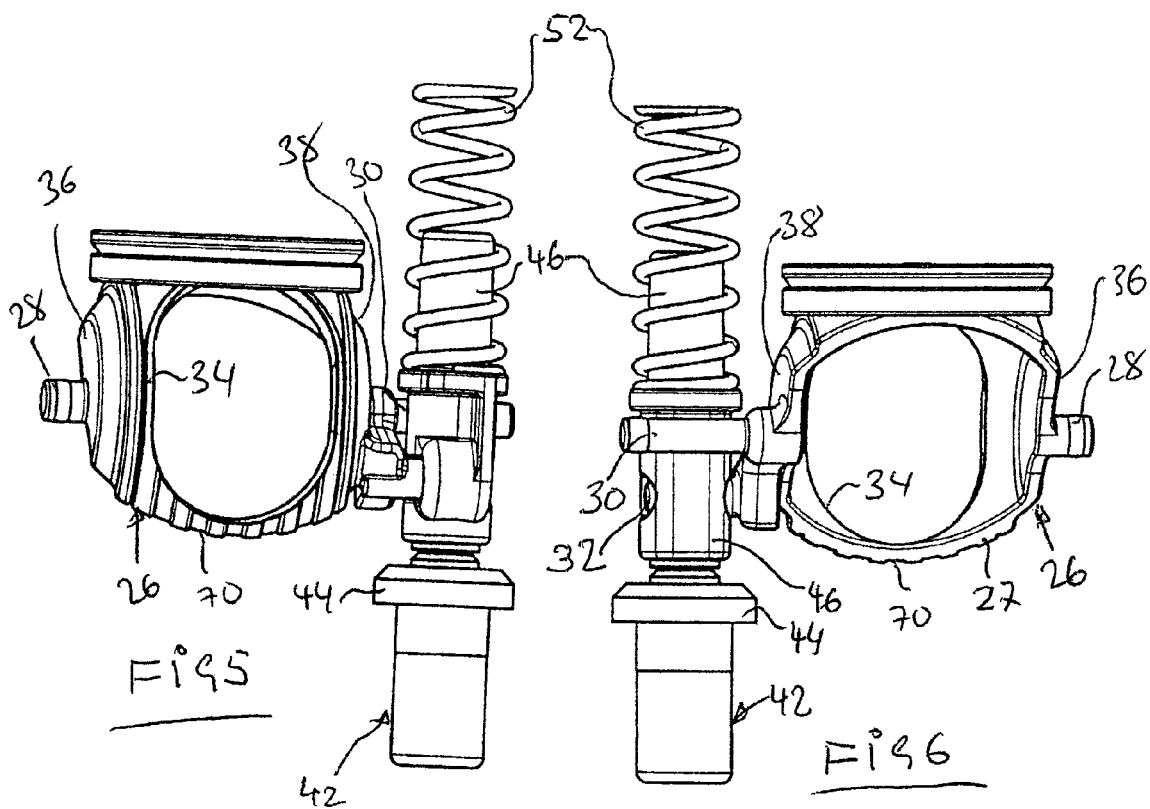
Fig 5
Fig 6

THERMOSTAT VALVE

RELATED APPLICATIONS

The present application is based on International Application Number PCT/IB2007/002229 filed Aug. 10, 2007, and claims priority from German Application Number 10 2006 038 213.7 filed Aug. 16, 2006, the disclosures of which are hereby incorporated by reference herein in their entirety.

The present invention relates to a thermostatted valve defined in the preamble of claim 1.

The German patent document DE 198 49 492 discloses an internal combustion engine's cooling-circuit adjustment valve of which the valve element is an open, annular cylinder rotatably supported in a cylindrical housing to selectively mutually block two port elements, to connect them to each other or also to allow mixed operation. This adjustment valve selectively connects a bypass or a radiator to the internal combustion engine's system of cooling ducts.

The German patent document DE 103 51 852 discloses an adjustment valve supported rotatably about a pivot axis within a housing. This housing comprises three circumferentially spaced ports for the bypass branch, for a radiator and a heater. The communication to the engine's cooling system is implemented by an axial access into the spherical valve element. Also a control valve for internal combustion engines is known form the German patent document DE 44 16 039 C1 or from the U.S. Pat. No. 3,072,379, wherein the valve element is a rotating slider rotatably supported in its matched housing. The last described control valves are driven by an illustratively electrical, stepping motor.

The objective of the present invention is an internal combustion engine's thermostatted valve offering compactness but nevertheless presenting minimal flow impedance in its individual switch positions.

This problem is solved by the features of claim 1.

In the design of the thermostatted valve of the present invention, all port axes are situated in planes perpendicular to its axis of rotation. The valve element is a spherical segment or a laminar, spherical element, its open side permanently communicating with the engine port. The valve element of the present invention comprises at least one feedthrough which is separated from the radiator port in said element's first end position while facing it in its second end position. A sealing system matching the spherical shape of the valve element is configured in the region of the radiator port. This sealing system prevents fluid situated outside the valve element from flowing into the radiator port. Lastly a drive is provided for the spherically laminar valve element and acts excentrically to the axis of rotation of and on the valve element.

In one of the end positions, also the basic position, into which the valve element may be prestressed, the sealing system rests in externally sealing manner against the valve element, as the result of which communication with the radiator has been blocked. However the engine communicates through the corresponding valve element position with the bypass port. When the valve element is rotated by the drive into the other end position, for instance requiring a rotation of about 90°, the aperture in the valve element will be aligned with the radiator port and the coolant is able to flow almost unhampered from the engine port into the radiator port. In this end position the bypass branch port is covered by the valve element. However this sealing action relative to the bypass port need not be especially thorough because substantially all the medium is already flowing toward the radiator. When the valve element assumes an intermediate position between the two end positions, the cooling medium will be split. Depending on the aperture's open cross-section, more or less coolant shall flow to the radiator port or to the bypass branch.

In one embodiment mode of the present invention, the valve element is designed as a smooth, spherical surface only in the zone covered by the sealing system. It is critical in this design that the cross-sectional flow aperture from the housing inside to the radiator port be sealed in a manner that, depending on the on the angular valve element rotational position, the medium may flow solely through the valve element's feedthrough into the radiator port when said feedthrough more or less covers the radiator port aperture.

The valve element may comprise relative small flattened surfaces opposite sides approximately perpendicularly to the axis of rotation. In this manner the valve element and the valve housing may be made commensurately compact.

Preferably the valve element is integrally made of plastic and fitted with diametrically configured journals supporting it in the valve housing. In a further embodiment of the present invention, the valve element may be fitted with an actuation pin running parallel to said bearing pins and excentric to the axis of rotation and cooperating with a drive.

Outside the area which is in contact with the sealing system, the valve element may be fitted at its outside with grooves or recesses. These grooves or recesses preferably run in planes that are perpendicular to the valve element's axis of rotation. Such a geometry precludes mold sand grains entrained in the cooling water from jamming the valve. Instead, the valve element is able to be self-cleaning.

A number of different drives may be used for the thermostat of the present invention. An expansible element linked by a transmission element to the valve element is especially advantageous. Preferably this expansible element is mounted in the housing on the side of the engine port. A related design of the present invention uses a spring-loaded rod being guided coaxially with the expansible element and resting against one of its ends, the actuation pin engaging an elongated slot in the said rod.

Alternatively the drive may be constituted by a so-called memory metal configured either outside or inside the housing and linked by a transmission element to the valve element.

Lastly the drive also may be an electric motor mounted externally on the housing and linked by a transmission element to the valve element. The electric motor's control is connected to a temperature sensor to allow valve element actuation as a function of the temperature detected by the temperature sensor. The temperature sensor may detect the temperature at the engine port in the housing. However the temperature also might be measured in the internal combustion engine's oil circuit and drive the thermostatted valve accordingly.

Preferably the sealing system of the thermostat of the present invention is fitted with a slideable ring made of a solid, slippery plastic resting against the valve element's external surface and prestressed by an elastomeric sealing annulus against the valve element, the sealing annulus sealing the housing inside on the outside of the valve element relative to the radiator port. Illustratively the slideable ring is made of PTFE. The sealing annulus preferably is made of EPDM.

An illustrative embodiment mode of the thermostat of the present invention is elucidated below in relation to the appended drawings.

Figure 2:
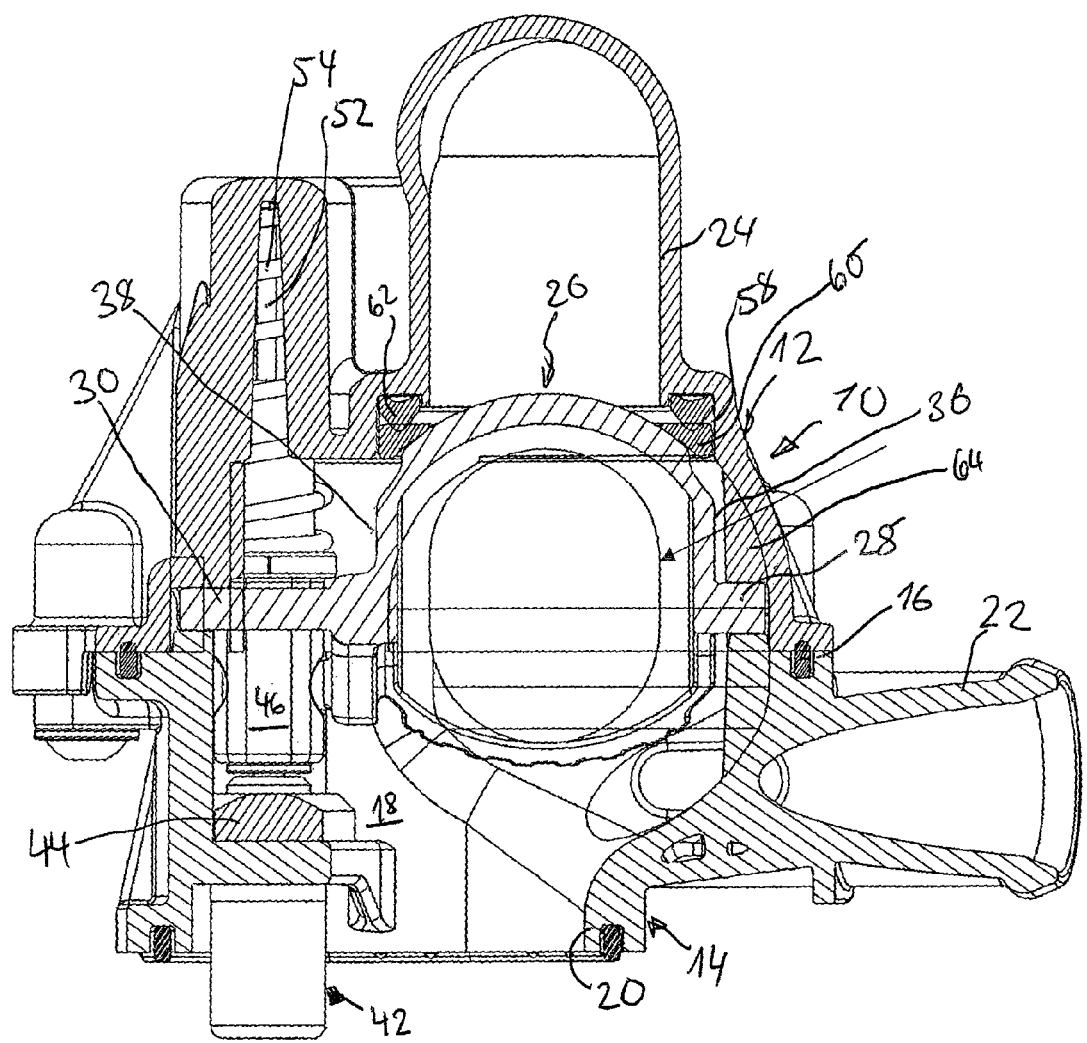
Figure 3:
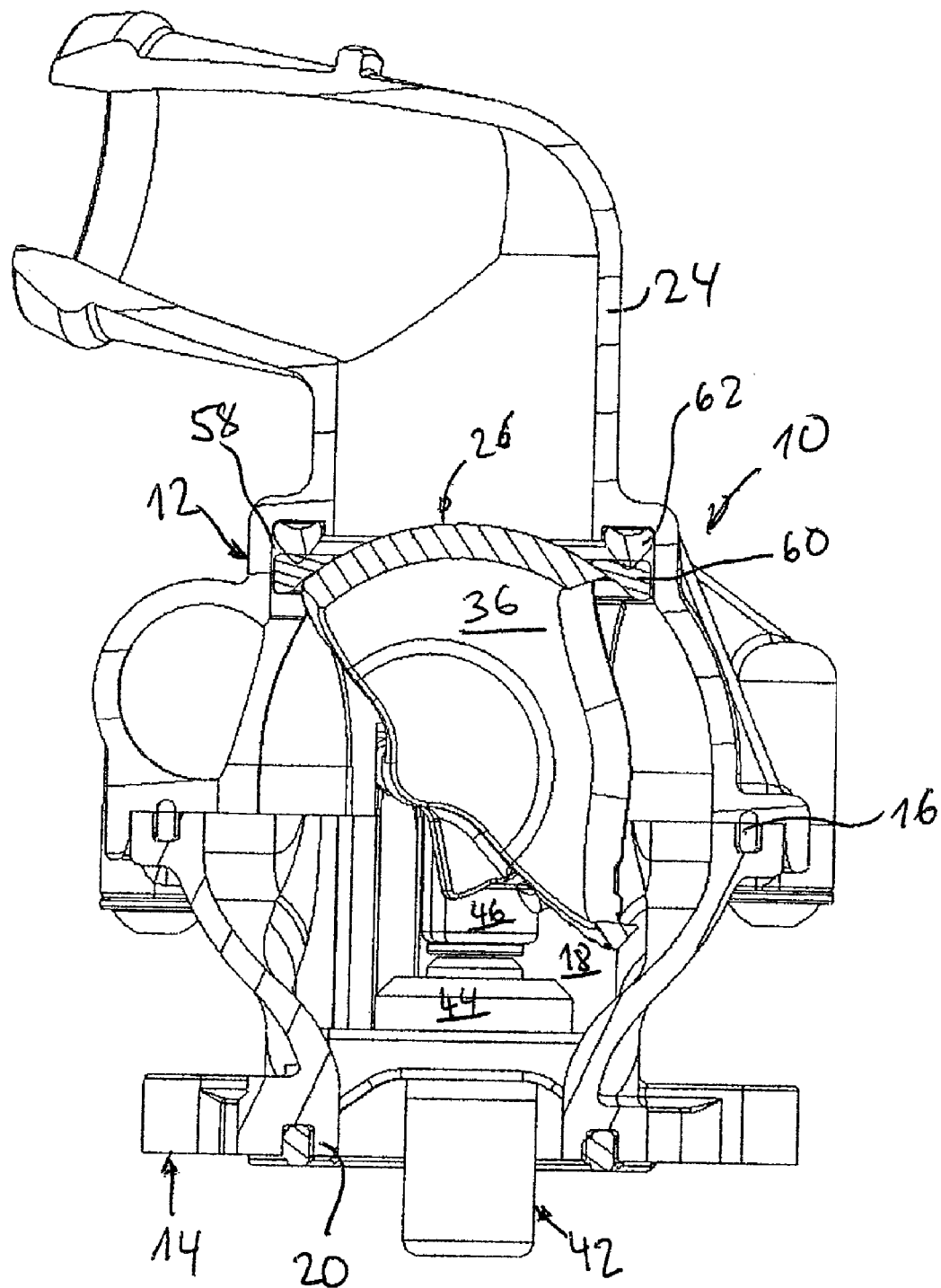
Figure 7:
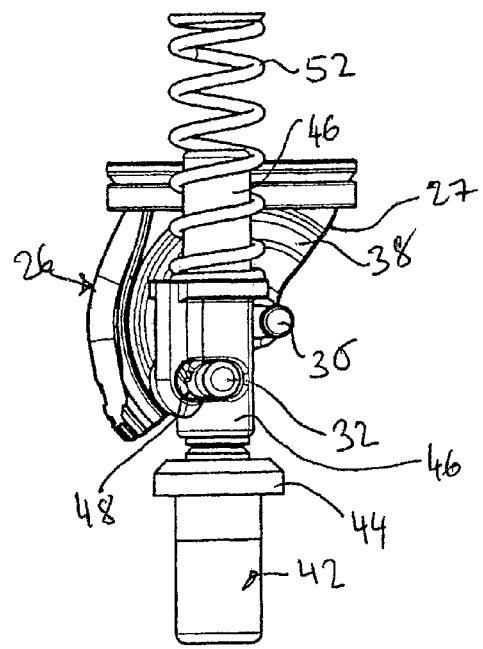
Figures 8, 9:
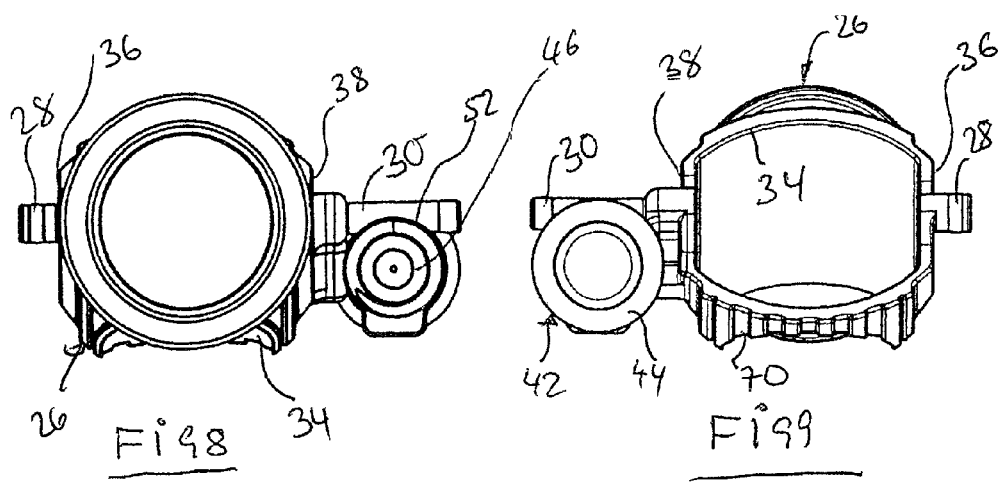

FIG. 1 is a section of the thermostatted valve of the invention,

FIG. 2 is a section offset by 180° relative to FIG. 1 of the thermostatted valve of the invention, FIG. 3 is a section offset by 90° relative to FIG. 2 of the thermostatted valve of the invention, FIG. 4 is a perspective of the valve element of the thermostatted valve of FIGS. 1 through 3 fitted with a sealing system and an expansible element drive, FIG. 5 is a sideview relating to FIG. 4, FIG. 6 is a sideview offset by 180° relative to FIG. 4, FIG. 7 is a sideview offset by 90° from the view of FIG. 4, FIG. 8 is a topview relating to FIG. 4, and FIG. 9 is the bottom view of the thermostatted valve of FIG. 6.

FIGS. 1 through 3 show a thermostatted valve which shall be integrated into an omitted cooling system of an internal combustion engine which is also omitted. The thermostatted valve comprises a housing 10 which is an assembly of an upper part 12 and a lower part 14. The upper and lower parts 12, 14 are clamped together by plane surface segments and may be tightly joined to each other by appropriate screws/bolts, an O-ring seal 16 being placed between said mutually abutting surface segments. The said upper and lower parts subtend a housing chamber 18. The housing chamber 18 is fitted with three ports. A first port 20 connects to the cooling duct system of the omitted internal combustion engine. The upper part 12 is fitted with two ports, namely the port 22 communicating with a bypass line of the cooling system and the port 24 communicating with a radiator. Such cooling systems are state of the art and therefore need not be described in detail.

The upper and lower parts 12, 14 are made of an appropriate plastic or of a cast light metal, the ports 22, 24 being integrally formed with the upper part 12.

Conventionally it is the purpose of a thermostatted valve to selectively guide the coolant from the engine through a bypass or a radiator back to said engine. When the thermostatted valve is in an intermediate position, the coolant is returned both through the bypass path and the radiator to the engine.

The thermostatted valve of FIGS. 1 through 3 comprises a valve element 26 in the shape of a laminar hemisphere. FIGS. 4 through 9 show the geometry of the valve element more clearly. Diametrically opposite journals 28, 30 of said element 26 constitute a pivot axis and are situated along a valve element diameter situated approximately in the plane passing through the rim 27 of the laminar hemisphere. An actuation pin 32 runs parallel and excentrically to the journal 30 and is mounted on the valve element 26. Moreover the laminar hemisphere is fitted with an approximately oval feedthrough 34. Laterally at the journals 28, 30, the laminar hemisphere is fitted with comparatively small flat surfaces 38, 38. As a result the laminar hemisphere, i.e. the valve element 26, assumes a spherical respectively an externally spherical shape only across the width of the feedthrough 34 respectively slightly beyond.

An expansible element 42 fitted with a radial flange 44 rests on an inner shoulder 40 of the lower housing part 14 in the chamber 18. A transmission rod 46 is configured above the expansible element 42 and coaxial with it. As shown clearly especially in FIGS. 4 through 7, the transmission rod 46 is fitted at its end facing and near the expansible element 42 with an elongated slot 48 which is transverse to the longitudinal axis of the transmission rod 46. The actuation pin 32 of the valve element 26 passes through the elongated slot 46. The transmission rod 46 is fitted with a blind hole 50 running from the other end almost to the elongated slot 48 and receiving a coaxial guide pin 52 constituted in the upper part 12. In this manner, when displaced, the transmission rod 46 is guided axially. A helical spring 54 rests against the upper end in a space of the upper part 12 receiving the spring and by its other end against a radial flange of the transmission rod 46 in order to prestress this rod against the expansible element 42.

A sealing system is mounted in a circular clearance 58 issuing from the upper part of the housing chamber 18 and opposite the port 20. This sealing system consists of a slideable ring 60 made of PTFE and a sealing annulus 62 of an elastomeric material such EPDM. The geometry of the slideable ring 60 on its side facing the valve element 26 matches the spherical surface of the valve element. The sealing annulus 62 approximately assumes a cross-sectional V shape. It provides not only sealing but also acts as a spring. By means of the spring force exerted by the sealing annulus 26, the slideable ring 60 rests at a predetermined force against the valve element 26. The spring characteristic of the sealing annulus 62 is such that when an effective deforming force is applied to it, sealing element 62, the opposing spring force shall increase only slightly. As a result, regardless of the distance between the valve element 26 and the bottom of the clearance 58, the compression of the slideable ring 60 on the valve element 26 shall remain approximately constant. In this way the inevitable tolerances incurred in manufacturing plastic items may be compensated.

This sealing system precludes liquid from flowing out of the chamber 18 between the slideable ring 60 and the valve element 26 respectively between the sealing system and the port 24.

As indicated in FIGS. 1 through 3, the valve element 26 is rotatably resting by means of the journals 28, 30 in the upper part 12 of the valve housing 10. The journal 30 is seated in a borehole of a segment 64 inserted inside the chamber 18 and resting against the associated inside wall portions of the upper and lower parts 12, 14. The affixation of the segment 64 is not shown in detail.

FIGS. 1 through 3 show the valve element 26 in one end position. As indicated, the ports 20 and 22 communicate in that end position. FIG. 1 shows an ovate aperture 68 in the upper part 12 to communicate with the port 22. On the other hand the port 24 is blocked. This position will be assumed by the shown thermostatted valve when the internal combustion engine's coolant—for instance water—is cold, illustratively being at ambient temperature. When the engine starts, the coolant moves through the bypass directly back into the said engine's system of cooling ducts. The coolant is moved conventionally using a pump. As the coolant temperature rises, the expansible element 42 dilates and actuates the transmission rod 46. The actuation pin 32 being excentric to the pivot axis, the valve element will also be pivoted. Depending on the pivoting excursion, the feedthrough 34 of the valve element 26 moves into the zone being overlapped by the slideable ring 60. In this manner the flow is being split, namely one portion moves through the port 24 into a radiator and one portion moves through the port 22 to the bypass. When a predetermined temperature is reached, for instance the internal combustion engine's operating temperature, said feedthrough 34 fully overlaps the port 24, as a result of which the coolant flows entirely through the radiator. The bypass is substantially blocked even though complete sealing is not attained. Such full sealing is unnecessary for reasons well known. The excursion of the pivot angle is about 90°.

The thermostatted valve shown in the appended Figures regulates the coolant flow to the radiator respectively the bypass. Conceivably however, the valve element 26 may be fitted with a further feedthrough cooperating with a further port in the housing 10, said port for instance feeding a heater heating the motor vehicle.

The laminar hemisphere of the valve element 26 is configured with a smooth outer spherical surface in the region engaged by the slideable ring 60. Outside this region, the valve element is fitted with grooves. These grooves run in planes perpendicular to the pivot axis of the valve element 26 and implement self-cleaning. Sand grains or the like may be flushed jointly with the coolant into the thermostatted valve and would degrade valve operation. This eventuality is precluded by the shown grooves 70.

The integration of the thermostatted valve of the invention into the internal combustion engine is not shown in the Figures. Implicitly corresponding hoses of the cooling system can be connected to the ports 20 through 24.

The invention claimed is:

1. A thermostatted valve used in an internal combustion engine and comprising a housing fitted with at least three ports, namely an engine port to communicate with the engine cooling system, a radiator port to communicate with the radiator, and a bypass port to communicate with a bypass, further comprising a hollow, spherical valve element supported pivotably about a pivot axis within the housing between two end positions, said valve element being fitted with at least two apertures of which one permanently communicates with the engine port and the other is situated in a plane substantially perpendicular to said pivot axis, further comprising a temperature sensor controlled valve element drive, characterized in that the axes of all ports are configured in planes that are approximately perpendicular to the pivot axis of the valve element, in that the valve element is approximately a spherical segment or a laminar sphere of which the open side communicates permanently with the engine port, further that the valve element is fitted with at least one feedthrough which in one of the end positions of said valve element is disconnected from the radiator port while in the other end position it faces this radiator port, in that an approximately spherical sealing system is configured in the zone of the radiator port and in that said drive acts on the valve element excentrically relative to the pivot axis.

2. Thermostatted valve as claimed in claim 1, characterized in that the valve element assumes a smooth spherical surface only in the zone spanned by the sealing system.

3. Thermostatted valve as claimed in claim 1, characterized in that the valve element is fitted with comparatively small flat surfaces on opposite sides that run approximately perpendicularly to the pivot axis.

4. Thermostatted valve as claimed in claim 1, characterized in that the valve element is integral and plastic and fitted with diametrical external journals to support it in the housing.

5. Thermostatted valve as claimed in claim 4, characterized by an excentric actuation pin which is integral with the valve element, runs parallel to a journal and cooperates with the drive.

6. Thermostatted valve as claimed in claim 5, characterized in that a transmission rod loaded by a spring is guided coaxially with the expansible element within the housing and rests against one end of the expansible element and in that the actuation pin engages an elongated slot of the rod.

7. Thermostatted valve as claimed in claim 1, characterized in that the valve element is fitted with external grooves or recesses outside the surface engaged by the sealing system.

8. Thermostatted valve as claimed in claim 7, characterized in that the grooves run in planes that are perpendicular to the pivot axis.

9. Thermostatted valve as claimed in claim 1, characterized in that the drive is an expansible element which is linked by a transmission element to the valve element.

10. Thermostatted valve as claimed in claim 1, characterized in that the expansible element is configured at the side of the engine port in the housing.

11. Thermostatted valve as claimed in claim 10, characterized in that a transmission rod loaded by a spring is guided coaxially with the expansible element within the housing and rests against one end of the expansible element and in that the actuation pin engages an elongated slot of the rod.

12. Thermostatted valve as claimed in claim 1, characterized in that the drive is made of a memory metal which is configured on the side of the engine port in the housing and which is linked by a transmission element to the valve element.

13. Thermostatted valve as claimed in claim 1, characterized in that the drive is an electric motor configured externally on the housing and linked by a transmission element to the valve element, said thermostatted valve being fitted with a temperature sensor to control the motor actuating the valve element as a function of the sensor-detected temperature.

14. Thermostatted valve as claimed in claim 13, characterized in that the temperature sensor is mounted on the side of the engine port in the housing.

15. Thermostatted valve as claimed in claim 13, characterized in that the temperature sensor is configured in the circuit of a further coolant, in particular oil, flowing in the internal combustion engine.

16. Thermostatted valve as claimed in claim 1, characterized in that the sealing system is fitted with a slideable ring made of a solid, low-friction plastic prestressed by an elastomeric sealing annulus against the valve element, and the sealing annulus, on the outside of the valve element relative to the coolant port, sealing the inside of the housing.

17. Thermostatted valve as claimed in claim 1, characterized in that the elastomeric annulus is designed in a manner that its spring force rises only minimally when a force is applied to it.

18. Thermostatted valve as claimed in claim 1, characterized in that the housing consists of an upper and a lower part, the radiator port and the bypass port being constituted at the upper part and the engine port resting on the lower part and the valve element and the sealing system being supported in the upper part.

* * * * *